(12) United States Patent
Sheng (10) Patent No.: US 7,788,471 B2
(45) Date of Patent: Aug. 31, 2010

(54) DATA PROCESSOR AND METHODS THEREOF

(75) Inventor: Chengke Sheng, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 315 days.

(21) Appl. No.: 11/522,634

(22) Filed: Sep. 18, 2006

(65) Prior Publication Data

US 2008/0072010 A1     Mar. 20, 2008

(51) Int. Cl.
G06F 9/345     (2006.01)
G06F 9/355     (2006.01)

(52) U.S. Cl. .............. 712/208; 712/2; 712/4; 712/9; 712/22; 712/213; 712/222; 711/5; 711/214; 711/221

(58) Field of Classification Search .............. 712/2, 712/4, 9, 22, 222, 208, 213, 5, 214, 221
See application file for complete search history.

(56) References Cited

U.S. PATENT DOCUMENTS

| | | | |
|---|---|---|---|
| 4,117,541 A | 9/1978 | Ali | |
| 4,748,585 A | 5/1988 | Chiarulli | |
| 5,019,968 A * | 5/1991 | Wang et al. | 712/4 |
| 5,187,796 A * | 2/1993 | Wang et al. | 712/4 |
| 5,206,822 A * | 4/1993 | Taylor | 708/607 |
| 5,299,320 A * | 3/1994 | Aono et al. | 712/231 |
| 5,379,440 A | 1/1995 | Kelly et al. | |
| 5,437,043 A * | 7/1995 | Fujii et al. | 712/1 |
| 5,450,557 A | 9/1995 | Kopp et al. | |
| 5,680,634 A | 10/1997 | Estes | |
| 5,706,460 A | 1/1998 | Craig et al. | |
| 5,852,740 A | 12/1998 | Estes | |
| 5,864,703 A * | 1/1999 | van Hook et al. | 712/22 |
| 5,886,537 A | 3/1999 | Macias et al. | |
| 5,991,865 A * | 11/1999 | Longhenry et al. | 712/7 |
| 6,665,790 B1 * | 12/2003 | Glossner et al. | 712/4 |
| 6,782,470 B1 * | 8/2004 | Berg et al. | 712/225 |
| 6,922,716 B2 * | 7/2005 | Desai et al. | 708/524 |
| 7,167,972 B2 * | 1/2007 | Barlow et al. | 712/222 |
| 2002/0045441 A1 | 4/2002 | Ralston et al. | |
| 2005/0076187 A1 | 4/2005 | Claydon | |

(Continued)

FOREIGN PATENT DOCUMENTS

GB     2 286 909 A     8/1995

OTHER PUBLICATIONS

Andrew S. Tannenbaum, Structured Computer Organization, 2nd edition, 1984, Prentice-Hall, p. 11.*

Primary Examiner—William M Treat (57) ABSTRACT

A system and method for performing vector arithmetic is disclosed. The method includes loading two operand vectors, each composed of a number of vector elements, into two storage locations. A selected arithmetic operation is performed on the operand vectors to produce a result vector having the number of vector elements. Each vector element of the result vector is associated with an arithmetic logic cell that has a first input that can receive any vector element from the first vector and a second input that can receive any vector element from the second vector. Accordingly each vector element of the result vector is a function of any two individual vector elements of the operand vectors. By applying the operand vector elements to the appropriate arithmetic logic cells, and by selecting the appropriate arithmetic operation, complex vector operations can be performed efficiently.

16 Claims, 4 Drawing Sheets

U.S. PATENT DOCUMENTS

2005/0216700 A1 9/2005 Honary et al.
2005/0282534 A1 12/2005 Subramanian et al.
2006/0003757 A1 1/2006 Subramanian et al.

* cited by examiner

DATA PROCESSOR AND METHODS THEREOF

FIELD OF THE DISCLOSURE

The present disclosure relates to data processors and more particularly to vector data processors.

BACKGROUND

Vector arithmetic is used in many applications. For example, encoding and decoding wireless data uses vector arithmetic. Such applications can demand many vector operations to perform functions such as mathematical transformations (e.g. Fast Fourier Transforms). Further, it is typically desirable that the vector operations be performed in a short amount of time. Some digital signal processors are typically unable, or require multiple processors, to perform the necessary vector operations in the desired amount of time. An Application Specific Integrated Circuit (ASIC) may be custom-made to perform the vector arithmetic, but such ASICs can be expensive to produce, and are difficult to re-use for different applications Accordingly, there is a need in the art for an improved system to perform vector arithmetic.

DETAILED DESCRIPTION

A system and method for performing vector arithmetic is disclosed. The method includes loading two operand vectors, each composed of a number of vector elements, into two storage locations. A selected arithmetic operation is performed on the operand vectors to produce a result vector having the number of vector elements. Each vector element of the result vector is associated with an arithmetic logic cell that has a first input that can receive any vector element from the first vector and a second input that can receive any vector element from the second vector. Accordingly each vector element of the result vector is a function of any two individual vector elements of the operand vectors. By applying the operand vector elements to the appropriate arithmetic logic cells, and by selecting the appropriate arithmetic operation, complex vector operations can be performed efficiently.

Figure 1:
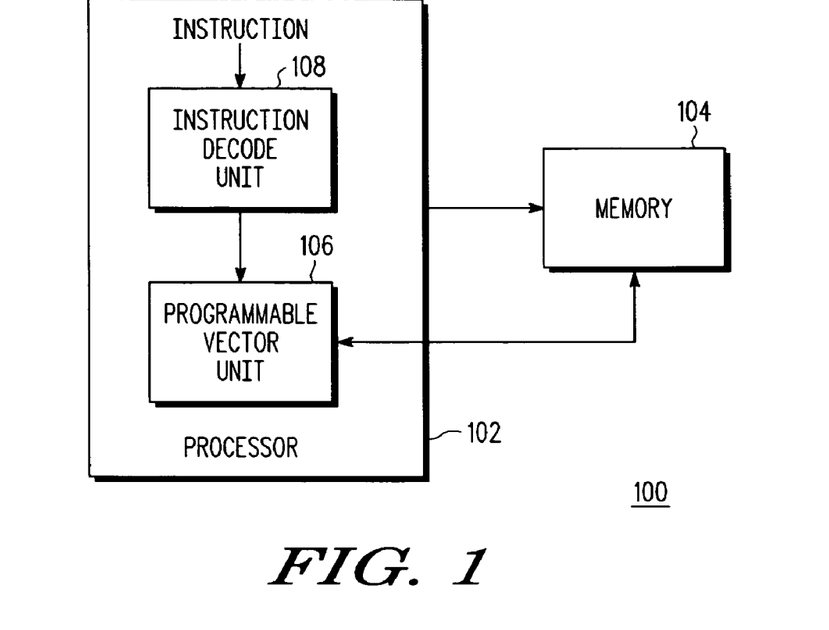
FIG. 1 is a block diagram of a particular embodiment of a system employing a programmable vector unit.

Referring to FIG. 1, a particular embodiment of system 100 is illustrated. The system 100 includes a processor 102, and a memory 104. The processor 102 may be located at a general purpose or application specific microprocessor, or other appropriate data processor module. In a particular embodiment, the processor 102 is a co-processor to a digital signal processor. The memory 104 may include registers and a random access memory (RAM) and the like. In a particular embodiment a RAM portion of the memory 104 is a two-dimensional memory having multiple banks. The memory 104 can also include instruction memory to store instructions for the processor 102. In an alternative embodiment, the instructions can be stored at the processor 102.

The processor 102 is connected to the memory 104 to receive and provide information. The processor 102 includes an instruction decode unit 108 and a programmable vector unit 106. The programmable vector unit 106 is connected to the instruction decode unit 108 and to the memory 104.

During operation, the instruction decode unit 108 receives an instruction for a vector arithmetic operation. The instruction can be received from an instruction cache of a processor, from instruction memory in the memory 104, or other appropriate module. The instruction decode unit 108 decodes the instruction and, based on the decoded instruction, provides control signals to the memory 104 and to the programmable vector unit 106 to perform a vector operation. The control signals provided to the memory 104 accesses the data memory portion of the memory 104 to provide vector operands for the vector operation based on the decoded instruction.

Based on the received control signals, the programmable vector unit 106 performs an arithmetic function on the received operands. The operand vectors are loaded into storage locations, such as registers, at the programmable vector unit 106. The vector operands may be loaded according to data patterns. That is, different elements of the vectors may be loaded from different locations in the memory 104 according to the data patterns. For example, the vector elements may be loaded from different banks of the memory 104, as well as different units in each bank. The vector elements may be represented by individual bits, bytes, words, and the like. In addition, the vector elements may be vectors themselves.

In a particular embodiment, the programmable vector unit includes a plurality of arithmetic processors (i.e. arithmetic logic cells). Each arithmetic logic cell includes an arithmetic logic unit to perform the arithmetic function. Each arithmetic logic cell includes two multiplexed inputs, so that each arithmetic logic unit receives one element of each operand vector, and any element of each operand vector can be applied to any arithmetic logic cell. Accordingly, the output of an arithmetic logic cell, and therefore the associated element of the result vector, can depend on any two elements of the operand vectors, one from each operand vector. Thus, the programmable vector unit 106 can perform a wide variety of vector operations, depending on the instruction decoded at the instruction decode unit 108. In addition, the arithmetic logic cells can perform their arithmetic functions on their operand vectors in parallel, so that the vector arithmetic may be implemented in an efficient fashion.

Once the vector elements are available to each of the arithmetic logic cells at the programmable vector unit 106, the appropriate arithmetic operation based on the instruction decoded at the instruction decode unit 108 is performed. Each arithmetic logic cell has a fixed output vector element. Accordingly, the outputs of the arithmetic logic cells together provide a result vector based on the arithmetic operation.

The programmable vector unit 106 can operate with a variety of control mechanisms. In one embodiment, the programmable vector unit 106 stops after execution of each instruction received from the instruction decode unit 108. In another particular embodiment, the instruction decode unit 108 can provide a sequence of instructions to the programmable vector unit 106, and the programmable vector unit 106 can execute the sequence without intervention by the instruction decode unit 108.

Figure 2:
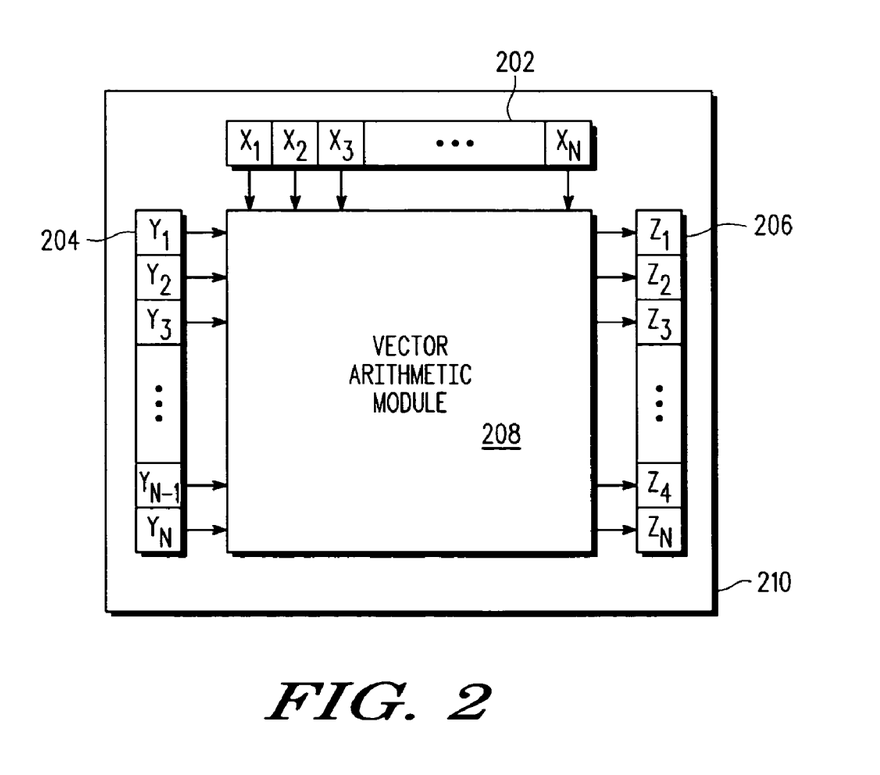
FIG. 2 is a block diagram illustrating a particular embodiment of the programmable array processor of FIG. 1.

Referring to FIG. 2, a programmable vector unit 200 that can be used as a particular embodiment of the programmable vector unit is illustrated. The programmable vector unit 200 includes a register 202, a register 204, and a register 206. The programmable vector unit 200 also includes a vector arithmetic module 208. The vector arithmetic module 208 includes a number of inputs connected to the register 202 and the register 204 to receive corresponding portions of those registers. In addition, the array arithmetic module includes a number of outputs to provide data to portions of the register 206. The registers 202, 204, and 206 can each be connected to the memory 104 to receive and provide information.

During operation, operand vectors are loaded from the memory 104 into the register 202 and the register 204. As illustrated, the register 202 receives an operand vector X (with individual vector elements of the vector X labeled $X_1$, $X_2$, through $X_N$) and the register 404 receives an operand vector Y (with individual vector elements of the vector Y labeled $Y_1$, $Y_2$, through $Y_N$). The vectors X and Y may be loaded from memory based on two dimensional data patterns, where the data patterns indicate the vectors' location, such as the bank index and unit index, of each vector element in the memory 104. Elements of the vectors stored in the register 202 and the register 204 are applied to the vector arithmetic module 208. The vector arithmetic module 208 performs arithmetic functions on the individual vector elements based on instructions received from the instruction decode unit 108.

The vector arithmetic module 208 includes a number of arithmetic logic cells. The elements of the operand vectors X and Y are applied to the arithmetic logic cells so that each arithmetic logic cell receives one vector element of each operand vector. In a particular embodiment, each arithmetic logic cell includes two multiplexed inputs, so that any vector element of the X vector and any vector element of the Y vector can be applied to any of the arithmetic logic cells. For example, one of the arithmetic logic cells can receive the vector elements $X_1$ and $Y_2$, while another of the arithmetic logic cells can receive the vector elements $X_3$ and $Y_1$.

Each arithmetic cell includes an arithmetic logic unit that performs a selected arithmetic function, such as an addition, a subtraction, a multiplication, and the like, on its received vector elements of the vector elements. The arithmetic function is performed at each of the arithmetic logic cells and is based on the decoded instruction.

The output of the arithmetic logic cells are provided to the register 206 as individual elements of the result vector Z. As previously discussed, each element of the result vector Z can depend on any combination of the vector elements of the operand vectors X and Y, one vector element from each operand. For example, in a particular embodiment, the vector element $Z_1$ can be the result of adding $X_1$ and $Y_2$, while the vector element $Z_N$ can be the result of adding $X_3$ and $Y_1$. Further, the individual vector elements of the third vector may be stored in different locations of the memory 104 according to an output data pattern. Thus, the individual vector elements of the result vector Z can be stored in different banks or units of the memory 104.

Figure 3:
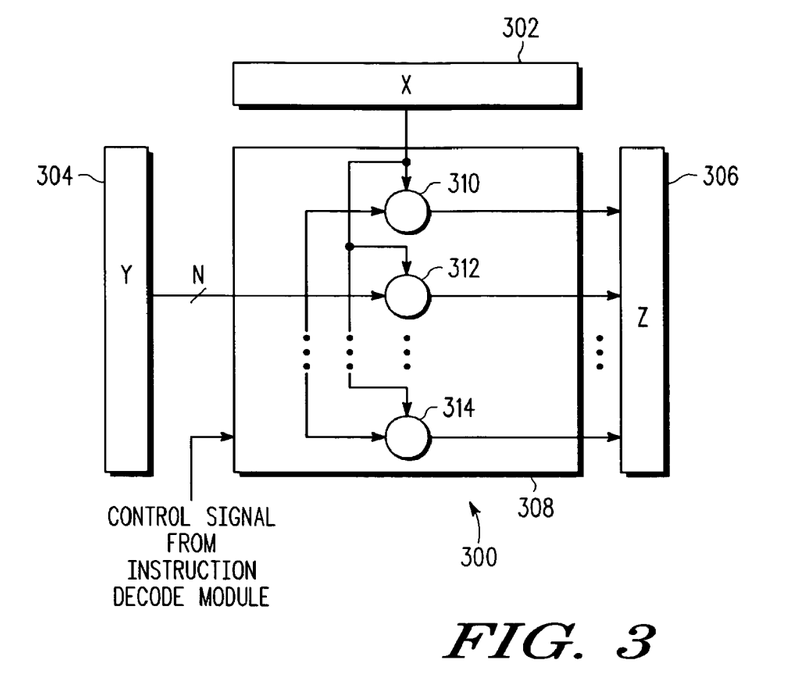
FIG. 3 is a block diagram illustrating a particular embodiment of the array arithmetic module of FIG. 2.

Referring to FIG. 3, a particular embodiment of a system 300 including an vector arithmetic module 308 is illustrated. The system 300 includes registers 302, 304, a register 306, and a vector arithmetic module 308, corresponding to elements 202, 204, 206, and 208 of FIG. 2. The vector arithmetic module 308 includes inputs connected to an outputs of the register 302, and inputs connected to outputs of the register 304, and a number of outputs connected to the register 306. The vector arithmetic module 308 includes a number of arithmetic logic cells including arithmetic logic cell 310, arithmetic logic cell 312, and $N^{th}$ arithmetic logic cell 314. The vector arithmetic module receives control signals from the instruction decode module 108.

During operation, the register 302 stores a vector X and the register 304 stores a vector Y. Based on the control signals received from the instruction decode module 108 the vector elements of the vectors X and Y are applied to the plurality of arithmetic logic cells, including arithmetic logic cell 310, arithmetic logic cell 312, and arithmetic logic cell 314. The control signals also select the arithmetic function of each arithmetic logic cell. The results of each of the arithmetic logic cells are provided to the register 306. Accordingly, after the arithmetic function has been performed, the resulting vector will be stored in the register 306 as the vector Z. In a particular embodiment the arithmetic logic cells perform the arithmetic function in parallel.

The instruction decode module 108 can also access a table of data patterns based on the received instruction. The vector elements of the vectors X and Y are loaded from the memory 104 into the register 302 and the register 304, respectively, based on the accessed table of data patterns. In addition, the vector Z stored in the register 306 can be stored in the memory 104 based on the accessed table of data patterns. In a particular embodiment, the vector Z is provided to an adder tree (not shown) to add vector elements of the vector Z.

Figure 4:
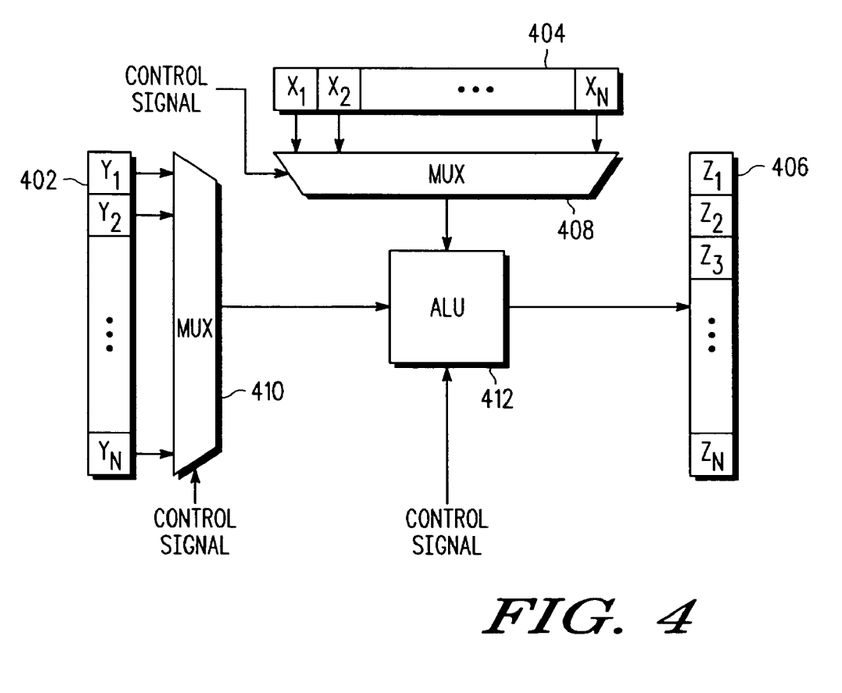
FIG. 4 is a block diagram illustrating a particular embodiment of one of the arithmetic logic cells of FIG. 3.

Referring to FIG. 4, of a system 400 that represents portions of a particular embodiment of the system 300 of FIG. 3 is illustrated. The system 400 includes a register 402, a register 404, and a register 406 corresponding to registers 302, 304, and 306 of FIG. 3. The system 400 also includes a multiplexer 408, a multiplexer 410, and arithmetic logic unit 412. The register 402 includes a number of outputs connected to corresponding inputs of the multiplexer 410. The register 404 includes a number of outputs connected to corresponding inputs of the multiplexer 408. The multiplexers 408 and 410 each include control inputs to receive control signals from the instruction decode module 106. The arithmetic logic unit 412 includes an input connected to an output of the multiplexer 408, an input connected to an output of the multiplexer 410, a control input to receive control signals provided by the instruction decode module 106, and an output. The register 406 includes an input connected to the output of the arithmetic logic unit 412.

During operation, control signals provided by the instruction decode module 106 are applied to the multiplexer 408 and the multiplexer 410. Based on the control signals, vector elements of the vectors X and Y stored in the register 404 and the register 402 are routed to the arithmetic logic unit 412, respectively. For example, the instruction decode module 414 can apply control signals to the multiplexer 408 and the multiplexer 410 so that the vector elements X(2) and Y(2) are applied to the arithmetic logic unit 412. In addition, based on the received instruction, the instruction decode module applies a control signal to the arithmetic logic unit 412 to perform the desired arithmetic function, such as addition, multiplication, or other appropriate function. The result of the arithmetic function is stored as a vector element of the vector Z in the register 406. Accordingly, each vector element of the result vector Z can depend on any two vector elements of the operand vectors X and Y.

The arithmetic logic unit 412 may perform a variety of arithmetic functions, such as addition, subtraction, multiplication, and other operations. To perform these operations, the arithmetic logic unit 412 can include a multiplier, an adder, one or more shifters, and other logic modules to perform the arithmetic operations. Further, the arithmetic logic unit 412 can include a control register to control operation of the unit. The control register may be set by the control signal.

Figure 5:
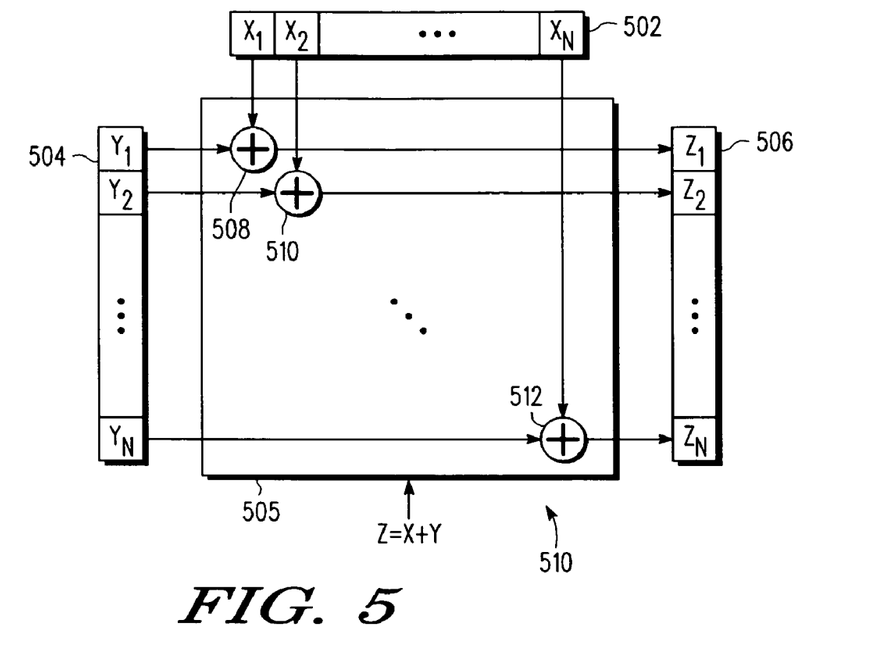
FIG. 5 is a block diagram illustrating a particular embodiment of a vector operation that may be implemented with the array arithmetic module of FIG. 3.

Referring to FIG. 5, a particular embodiment of a vector operation Z=X+Y implemented with the programmable vector unit 106 is illustrated. The vector operation Z=X+Y results in a portion of a vector 502 being added to a portion of a vector 504 and the result stored in a vector 506. The vector operation Z=X+Y is performed by the vector arithmetic module 505 based on control information from an instruction being executed. The vector arithmetic module 505 includes a number of arithmetic logic cells including arithmetic logic cells 508, 510, and $n^{th}$ arithmetic logic cell 512.

As illustrated, the arithmetic processing unit 505 is performing a vector addition operation on the vectors 502 and 504, respectively. Accordingly, control signals have been applied to the arithmetic processing module 505 so that the arithmetic logic cell 508 receives in the illustrated embodiment the vector elements $X_1$ and $Y_1$. Similarly, the arithmetic logic cell 510 receives the vector elements $X_2$ and $Y_2$. An addition operation is performed at each arithmetic logic cell, and the output of each arithmetic logic cell corresponds to a vector element of the result vector Z. Accordingly, as illustrated the vector element $Z_1$ is the result of the addition of the vector elements $X_1$ and $Y_1$, while the vector element $Z_2$ is the result of the addition of the vector elements $X_2$ and $Y_2$. Thus, the result vector Z will be the result of the addition of the vectors X and Y.

As illustrated, the vector elements of the vectors X and Y are applied to the arithmetic logic cells in such a manner as to "place" the arithmetic logic cells along a diagonal of a grid formed by intersections of the vector elements of vector X and vector Y. Note that a specific arithmetic logic cell is defined herein as placed at a grid location when it is programmed to received the inputs at that intersection. Other placements therefore form other two dimensional patterns to place each arithmetic logic cell independently of each other arithmetic logic cell on the grid formed by the intersection. The two dimensional pattern is based on a table associated with an instruction decoded at an instruction decode unit.

Figure 6:
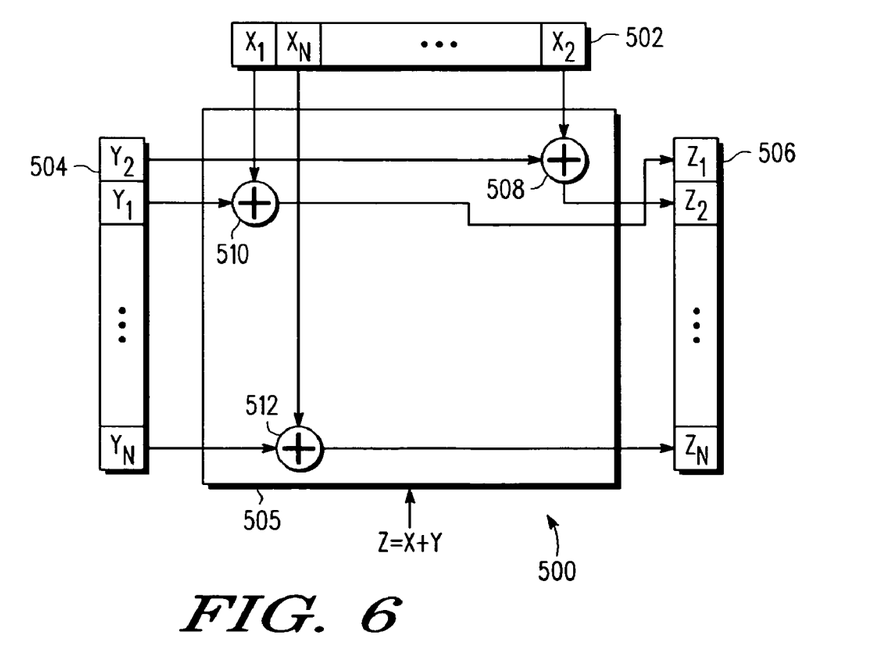
FIG. 6 is a block diagram illustrating an alternative embodiment of a vector operation that may be implemented with the array arithmetic module of FIG. 3.

Referring to FIG. 6, an alternative embodiment of a vector operation that may be implemented with the programmable vector unit 106 is illustrated. As illustrated in FIG. 6, the vector elements of the vectors 502 and 504 are arbitrarily arranged. The vectors 502 and 504 are added by "placing" each of the arithmetic logic cells of the array arithmetic module 505 to receive the appropriate vector elements. For example, as illustrated, the vector element $X_1$, which represents the first vector element of the vector 502, is added to the vector element $Y_1$, which represents the second vector element of the vector 504, at the arithmetic logic cell 510. Accordingly, as illustrated, the array arithmetic module may perform a wide variety of arithmetic functions, including arithmetic functions on different permutations of vector elements, by applying the appropriate vector elements to the inputs of the arithmetic logic cells.

Figure 7:
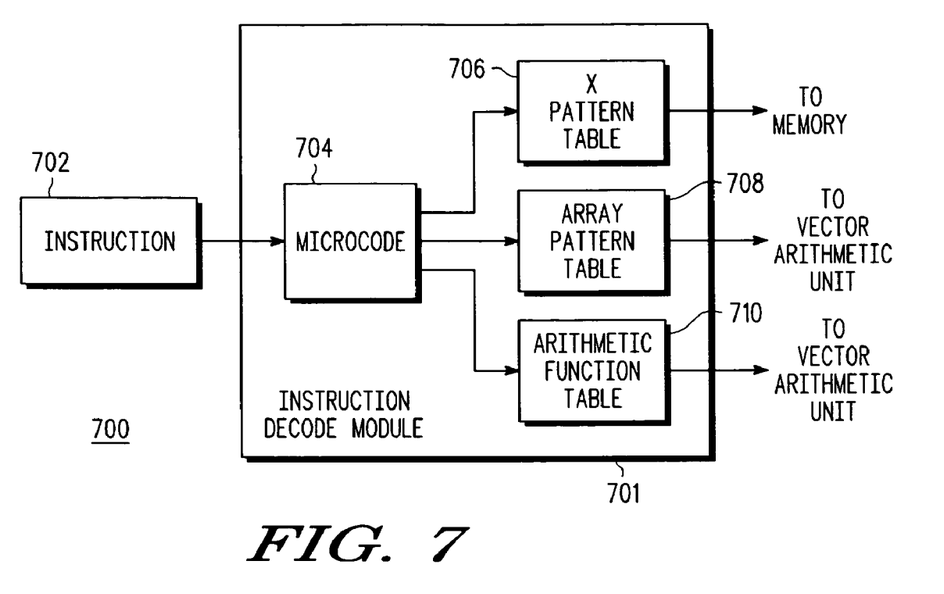
FIG. 7 is a block diagram illustrating a particular embodiment of the instruction decode module of FIG. 4.

Referring to FIG. 7, a block diagram of a system 700 illustrating an instruction decode module 701 is illustrated. In a particular embodiment, the instruction decode module is located at the processor 102. The instruction decode module 701 is able to efficiently process vector arithmetic instructions by accessing pattern tables based on the instruction, and thus able to perform vector arithmetic with a small amount of microcode for each instruction.

As illustrated, the instruction decode module 701 receives a vector arithmetic instruction 702. The vector arithmetic instruction 702 may be received from an instruction buffer at the processor 102, instruction memory in the memory 104, or other appropriate module. The instruction 702 may be stored in the buffer by an application controlling the processor 102 or other module.

The instruction decode module 701 accesses execution logic 704, which can be microcode or hardware, based on the vector arithmetic instruction 702 to control execution of the instruction 702. The execution logic 704 accesses a number of tables to implement the vector arithmetic instruction 702. In a particular embodiment, the execution logic 704 identifies locations in, or indexes to, the data pattern table 706, the array pattern table 708, and the arithmetic function table 710 to select the appropriate control information in each table depending on the instruction 702.

In particular, the execution logic 704 accesses the data pattern table 706 to indicate the locations of memory 104 storing the vector elements that will form vectors X and Y loaded at the registers of system 300, for example. The execution logic 704 also accesses the array pattern table 708 to locate a two-dimensional array pattern that will control which vector elements will be applied to the arithmetic logic cells of the programmable vector unit 106. In addition, the execution logic 704 accesses the arithmetic function table 710 to provide the appropriate arithmetic function for the vector arithmetic instruction 702.

Figure 8:
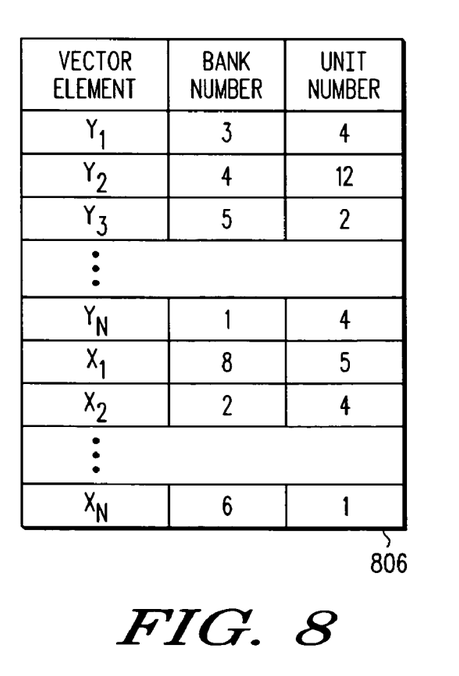
FIG. 8 is a diagram illustrating a particular embodiment of the data pattern table of FIG. 7.

Referring to FIG. 8, a data pattern table 806 representing a particular embodiment of the data pattern table 706 of FIG. 7 is illustrated. As shown, the data pattern table 806 includes a column of vector elements, a column of bank numbers, and a column of unit numbers. The bank number column identifies the bank of memory associated with the corresponding vector element in the vector element column. Similarly, the unit number column identifies the unit of memory in the memory bank that is associated with the corresponding vector element identified in the vector element column. For example, as illustrated, the vector element $Y_1$ is associated with bank number 3 and unit number 4. In a particular embodiment, the units in the memory share a single bus; therefore, in order to load the vector elements in parallel, each element of the vector is located in a different bank of memory.

When the data pattern table 806 is accessed based on the decoded vector arithmetic instruction 702, the vector element identified in the bank number and unit number columns will be provided to the programmable vector unit 106. For example, for the vector element $X_2$, the vector element located at bank 2, unit 4 will be provided from the memory 104.

Other techniques for identifying locations of vector elements may be employed. For example, rather than a bank and unit number, the memory location of each vector element can be identified by a base memory address and an offset, by a logical address, by a physical address, or other appropriate identifier.

Figure 9:
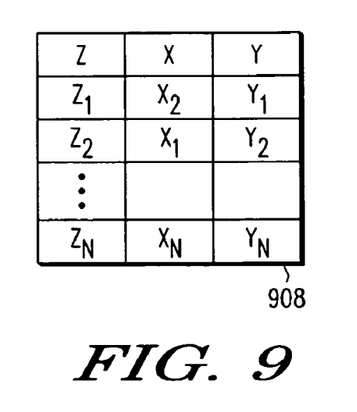
FIG. 9 is a diagram illustrating a particular embodiment of the array pattern table of FIG. 7.

Referring to FIG. 9, an array pattern table 908, representing a particular embodiment of the array pattern table 708 of FIG. 7, is illustrated. The array pattern table includes 3 columns, with the first column identifying an element of the result vector Z, and the second and third columns respectively identifying the vector elements of the operand vectors X and Y that will be applied to the arithmetic logic cell associated with the result vector element. For example, when the array pattern table 908 is accessed based on the vector arithmetic instruction 702, the vector elements $X_2$ and $Y_1$ will be applied to the arithmetic logic cell associated with the result vector element $Z_1$. It will be appreciated that different array pattern tables can be accessed to perform different vector functions, depending on the vector arithmetic instruction 702.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present disclosure is not intended to be limited to the specific form set forth herein, but on the contrary, it is intended to cover such alternatives, modifications, and equivalents, as can be reasonably included within the spirit and scope of the disclosure.

What is claimed is:

1. A method, comprising:
   determining a first vector based on a first data pattern indicated by a data pattern table, the first data pattern indicative of a corresponding memory location for each of a plurality of vector elements of the first vector;
   determining a second vector based on a second data pattern indicated by the data pattern table, the second data pattern indicative of a corresponding memory location for each of a plurality of vector elements of the second vector;
   selecting, based on a first entry of an array pattern table, one of the plurality of vector elements of the first vector to be provided to a first operand input of a first arithmetic processor;
   selecting, based on a second entry of the array pattern table, one of the plurality of vector elements of the second vector to be provided to a second operand input of the first arithmetic processor;
   calculating a first result based on information at the first operand input and information at the second operand input;
   storing the first result at a first vector element of a resultant vector, the first vector element based on a third entry of the array pattern table.

2. The method of claim 1, further comprising:
   identifying, based on information associated with the first instruction, a first arithmetic operation to be performed by the first arithmetic processor, wherein the first arithmetic processor is capable of performing a plurality of arithmetic operations.

3. The method of claim 2, wherein:
   calculating the first result comprises calculating the first result based on the first arithmetic operation, information at the first operand input, and information at the second operand input.

4. The method of claim 1, further comprising:
   selecting, based a fourth entry of the array pattern table, a second of the plurality of vector elements of the first vector to be provided to a first operand input of a second arithmetic processor; and
   selecting, based on a fifth entry of the array pattern table, a second of the plurality of vector elements of the second vector to be provided to a second operand input of the second arithmetic processor.

5. The method of claim 1, further comprising:
   selecting, based on a fourth entry of the array pattern table, the one of the plurality of vector elements of the first vector to be provided to a first operand input of a second arithmetic processor; and
   selecting, based a fifth entry of the array pattern table, the one of the plurality of vector elements of the second vector to be provided to a second operand input of the second arithmetic processor.

6. The method of claim 1, further comprising:
   selecting, based a fourth entry of the array pattern table, the one of the plurality of vector elements of the first vector to be provided to a first operand input of a second arithmetic processor; and
   selecting, based on a fifth entry of the array pattern table, a second of the plurality of vector elements of the second vector to be provided to a second operand input of the second arithmetic processor.

7. The method of claim 1, wherein the first instruction identifies an index with respect to the array pattern table.

8. The method of claim 1, wherein selecting the one of the plurality of vector elements of the first vector comprises loading the first vector element at a first storage location associated with the first operand input of the first arithmetic processor.

9. The method of claim 1, wherein selecting the one of the plurality of vector elements of the first vector comprises coupling a storage location storing the one of the plurality of vector elements to the first operand input of the first arithmetic processor.

10. The method of claim 1, wherein determining the first vector comprises loading a first element of the first vector from a first memory bank into a first register and loading a second element of the first vector from a second memory bank into the first register.

11. The method of claim 10, wherein determining the first vector comprises determining the first memory bank and the second memory bank based on the first data pattern.

12. The method of claim 10, wherein determining the second vector comprises loading a first element of the second vector from a third memory bank into a second register and loading a second element of the first vector from a fourth memory bank into the second register.

13. A method, comprising
   selecting a first data pattern from a first data pattern table, the first data pattern indicative of a corresponding memory location for each of a plurality of vector elements of a first vector;
   determining the first vector based on the first data pattern;
   selecting a second data pattern from a second data pattern table, the second data pattern indicative of a corresponding memory location for each of a plurality of vector elements of a second vector;
   loading a second vector based on the second data pattern;
   decoding a first instruction;
   selecting, based on a first entry of an array pattern table indicated by the first instruction, a first vector element of the first vector as a first operand of a first arithmetic processor and, based on a second entry of the array pattern table a first vector element of the second vector as a second operand of the first arithmetic processor, wherein the first vector comprises a plurality of vector elements and the second vector comprises a plurality of vector elements;
   selecting a first vector element of a result vector based on a third entry of the array pattern table; and calculating the first vector element of the result vector based on the first operand and the second operand.

14. A device, comprising:

a first storage location to store a first plurality of vector elements based on a first data pattern from a first data pattern table, the first data pattern indicative of a corresponding memory location for each of the first plurality of vector elements;

a second storage location to store a second plurality of vector elements based on a second data pattern from the first data pattern table, the second data pattern indicative of a corresponding memory location for each of the second plurality of vector elements;

a plurality of arithmetic logic cells, each one comprising:

a first multiplexer coupled to the first plurality of vector elements, a control input, and an output to provide a selected one of the first plurality of vector elements based on a first entry of a data pattern table and a second entry of the data pattern table;

a second multiplexer coupled to the second plurality of vector elements, a control input, and an output to provide a selected one of the second plurality of vector elements based on a third entry of the data pattern table and the second entry of the data pattern table; and an arithmetic logic unit having a first input coupled to the output of the first multiplexer, a second input coupled to the output of the second multiplexer, a control input, and an output to provide an arithmetic result based on the first input, the second input, and the control input; and an instruction execution module comprising a first output coupled to the control input of the first multiplexer and a second output coupled to the control input of the second multiplexer.

15. The device of claim 14, further comprising:

a third storage location coupled to the output of each arithmetic logic unit of the matrix of arithmetic logic cells.

16. The device of claim 14, wherein the instruction execution module comprises:

an instruction decode module having an input to receive a vector instruction, a first plurality of control outputs coupled to control outputs of the instruction execution module, and a second plurality of control outputs, each of the second plurality of control outputs coupled to corresponding ones of the control inputs of the arithmetic logic units of the plurality of arithmetic logic cells; and wherein the instruction decode module applies first control signals via the first plurality of control outputs to apply corresponding ones of the first and second plurality of vector elements at one or more of the arithmetic logic cells and applies second control signals via the second plurality of control outputs to select the operation of one or more of the arithmetic logic cells based on the vector instruction.

* * * * *

UNITED STATES PATENT AND TRADEMARK OFFICE
CERTIFICATE OF CORRECTION

| | | |
|---|---|---|
| PATENT NO. | : 7,788,471 B2 | Page 1 of 1 |
| APPLICATION NO. | : 11/522634 | |
| DATED | : August 31, 2010 | |
| INVENTOR(S) | : Chengke Sheng | |

It is certified that error appears in the above-identified patent and that said Letters Patent is hereby corrected as shown below:

Column 7, Line 60, please change "based a fourth entry" to --based on a fourth entry--

Column 8, Line 6, please change "based a fifth entry" to --based on a fifth entry--

Column 8, Line 11, please change "based a fourth entry" to --based on a fourth entry--

Signed and Sealed this
Eighteenth Day of October, 2011

David J. Kappos
*Director of the United States Patent and Trademark Office*